April 25, 1933.  G. E. GAUS  1,905,581
WIRE BALE TIE
Filed Dec. 16, 1932
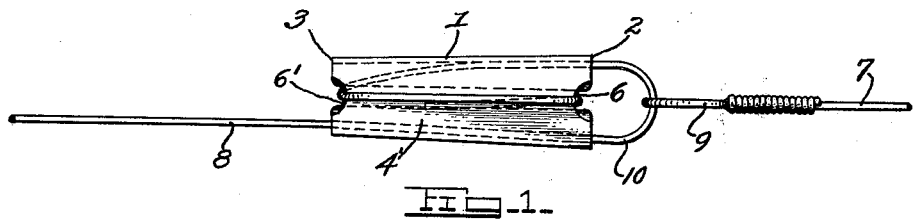
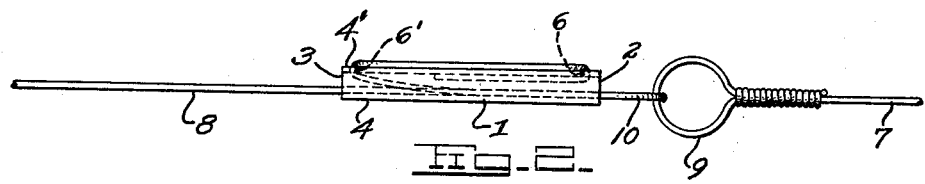
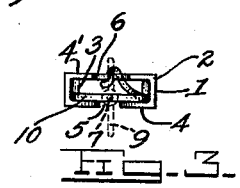
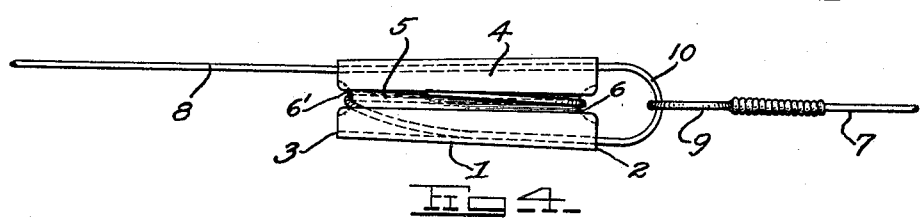
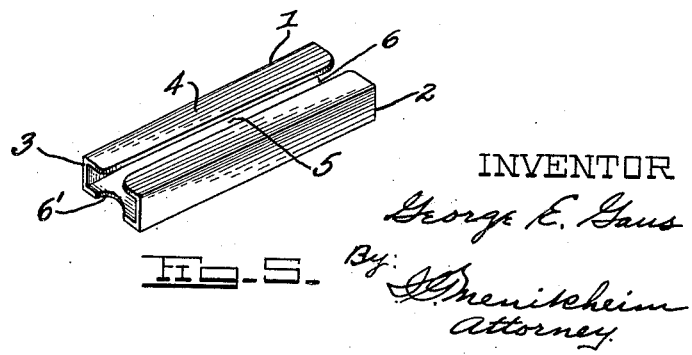
INVENTOR
George E. Gaus
By
Attorney.

Patented Apr. 25, 1933

1,905,581

UNITED STATES PATENT OFFICE

GEORGE E. GAUS, OF WASHINGTON, DISTRICT OF COLUMBIA, DEDICATED TO THE FREE USE OF THE GOVERNMENT AND THE PEOPLE

WIRE BALE-TIE

Application filed December 16, 1932. Serial No. 647,604.

(GRANTED UNDER THE ACT OF MARCH 3, 1883, AS AMENDED APRIL 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate this invention to the free use of the Government and the people of the United States.

My invention relates to that class of ties or bands formed of wire, made to be adjusted as to their length, and has for its object to provide a metallic bale-tie or fastener of simple or inexpensive construction permitting the tying of the wire without special tools. My invention also provides a locking feature that prevents the bale wire ends from separating under strain or expansive pressure of the baled material. My invention further provides means for covering the free or snag end of the bale wire and holds it in close contact with the baled material, thus obviating any danger of physical injury resulting from the protruding end of the wire, upon handling the baled material.

In order to carry out the purposes of my invention, reference is to be had to the peculiar structure, as shown in the accompanying drawing, forming a part of this specification, in which similar numerals refer to similar parts throughout the several views.

Figure I is a front view of my bale-tie fastener, as usually applied in practice with an adjustable bale wire.

Figure II illustrates a side view of my bale-tie with an adjustable bale wire in interlocking position.

Figure III is an end view of my bale-tie fastener with bale wire in interlocking position.

Figure IV is a back view of my bale-tie fastener, as usually applied in practice with an adjustable bale wire.

Figure V is a perspective view of my bale-tie.

Sleeve 1, of suitable metallic material, having its breadth tapering from end 2 to end 3, and its broad, or front and back, surfaces 4 and 4' parallel to each other. End 2 having an internal width slightly less than six times the diameter of bale wire 7. End 3 having an internal width slightly less than three times the diameter of bale wire 7. Slot 5, having parallel edges, bisects surface 4. Semicircular slots 6 and 6' are centrally cut in surface 4' at ends 2 and 3, respectively.

To practice my invention, bale wire 7 is passed around the bale encircling it in the conventional manner. Free end 8 of wire 7 is inserted through loop 9, bent backwards forming U-bend 10. Tapering sleeve 1 is then engaged with bale wire 7, by means of slot 5, below projecting end of U-bend 10 of wire 8 with end 2 of tapering sleeve 1 foremost. Slot 5 is held adjacent to the surface of the bale and tapering sleeve 1 pushed along wire 8 toward formed loop 9 on other end of bale wire 7, thus enclosing both legs of U-bend 10 made in free end 8. Free end 8 is then passed through semicircular slot 6', bent over surface 4' and engaged in semicircular slot 6. Free end 8 is then bent downwardly and pushed within tapering sleeve 1 through slot 5, thus encasing the snag end.

The shape of my fastener, particularly due to its small end, checks slipping of the bale wire, and prevents its dislodgment from within the fastener, when subjected to strain.

The longitudinal slot provides means for engaging the sleeve with the free end of the bale wire. The snag end of the wire is retained within my fastener by means of inserting it through the longitudinal slot.

Semicircular slots grip the wire without cutting and bending locks it in position.

Having thus described my invention, I claim as new and desire to secure by Letters Patent:

1. A bale-tie, comprising a metallic rectangular sleeve, having parallel tapering surfaces, semicircular slots cut at opposite ends of said sleeve, and a longitudinal slot, having parallel sides, bisecting said sleeve.

2. The combination, of a bale wire having a formed loop at one end, with a fastening device, comprising a metallic tapering sleeve, means for internally admitting the free end of said bale wire, means for locking without cutting said free end, and means for encasing said free end.

GEORGE E. GAUS.